(12) United States Patent
Mustajarvi

(10) Patent No.: US 9,185,637 B2
(45) Date of Patent: Nov. 10, 2015

(54) UPDATING OF NETWORK SELECTION INFORMATION

(75) Inventor: Jari Pekka Mustajarvi, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 8 days.

(21) Appl. No.: 13/641,879

(22) PCT Filed: Apr. 27, 2010

(86) PCT No.: PCT/EP2010/055582
§ 371 (c)(1),
(2), (4) Date: Oct. 18, 2012

(87) PCT Pub. No.: WO2011/134496
PCT Pub. Date: Nov. 3, 2011

(65) Prior Publication Data
US 2013/0034019 A1 Feb. 7, 2013

(51) Int. Cl.
*H04W 48/16* (2009.01)
*H04W 88/06* (2009.01)

(52) U.S. Cl.
CPC .............. *H04W 48/16* (2013.01); *H04W 88/06* (2013.01)

(58) Field of Classification Search
None
See application file for complete search history.

(56) References Cited

U.S. PATENT DOCUMENTS

2006/0277590 A1* 12/2006 Limont et al. ................ 726/1
2010/0215019 A1*  8/2010 Velev et al. ................ 370/331
2010/0235649 A1*  9/2010 Jeffries et al. .............. 713/189

FOREIGN PATENT DOCUMENTS

WO   WO 01/69435  A2   9/2001

OTHER PUBLICATIONS

International Search Report and Written Opinion dated Dec. 22, 2010 corresponding to International Patent Application No. PCT/EP2010/055582.
Toshiba Research Europe Ltd et al, "CR on limiting the amount of information delivered to the UE by ANDSF," 3GPP Draft; C1-085322, 3rd Generation Partnership Project (3GPP), 3GPP TSG CT WG1 Meeting #56; Nov. 17, 2008, XP050310228, 5 pages.
Qualcomm Europe et al, "Clarifications and clean-ups," 3GPP Draft; C1-092188, 3GPP TSG CT WG1 Meeting #58, Apr. 27, 2009, XP050337714, 12 pages.
Huawei, "Discussion about ANDSF," 3GPP Draft; S2-083355, 3GPP TSG SA WG2 Meeting #65, May 2, 2008, XP050265579, pp. 1-5.
3GPP: "3GPP TS 23.402 v8.2.0 (Jun. 2008) 3rd Generation Partnership Project; Technical Specification Group Services and System Aspects; Architecture Enhancements for non-3GPP Accesses (Release 8)", 3GPP TS 23.402 V8.2.0, Jun. 1, 2008, XP002532519, pp. 35-38.

(Continued)

*Primary Examiner* — Diane Lo
(74) *Attorney, Agent, or Firm* — Squire Patton Boggs (US) LLP

(57) ABSTRACT

A mechanism for updating network selection information (such as ANDSF information) as stored at a user device is described. An ANDSF server requests network selection policy signatures from a user device and compares those signatures with signatures calculated at the server. The ANDSF server instructs the user device to delete any policy whose signature is not found at the ANDSF server and instructs the user device to add any policy whose signature is found at the ANDSF server, but is not stored at the user device.

17 Claims, 4 Drawing Sheets

(56) References Cited

OTHER PUBLICATIONS

3GPP TS 24.312 V8.1.0 (Mar. 2009), Technical Specification, "3rd Generation Partnership Project; Technical Specification Group Core Network and Terminals; Access Network Discovery and Selection Function (ANDSF) Management Object (MO): (Release 8)", Mar. 2009, 82 pages.

ETSI TS 124.302 V8.5.0 (Apr. 2010), Technical Specification, "Universal Mobile Telecommunications System (UMTS); LTE; Access to the Evolved Packet Core (EPC) via non-3GPP access networks; Stage 3 (3GPP TS 24.302 version 8.5.0 Release 8)" Apr. 2010, 54 pages.

ETSI TS 123.402 V8.8.0 (Jan. 2010), Technical Specification, "Universal Mobile Telecommunications System (UMTS); LTE; Architecture enhancements for non-3GPP accesses (3GPP TS 23.402 version 8.8.0 Release 8)", Jan. 2010, 201 pages.

ETSI TS 124.302 V9.2.0 (Apr. 2010), Technical Specification, "Universal Mobile Telecommunications System (UMTS); LTE; Access to the Evolved Packet Core (EPC) via non-3GPP access networks; Stage 3 (3GPP TS 24.302 version 9.2.0 Release 9)", Apr. 2010, 57 pages.

3GPP TS 24.312 V8.5.0 (Mar. 2010), Technical Specification, "3rd Generation Partnership Project; Technical Specification Group Core Network and Terminals; Access Network Discovery and Selection Function (ANDSF) Managment Object (MO) (Release 8)", Mar. 2010, 85 pages.

3GPP TS 24.312 V9.1.0 (Mar. 2010), Technical Specification, "3rd Generation Partnership Project; Technical Specification Group Core Network and Terminals; Access Network Discovery and Selection Function (ANDSF) Management Object (MO) (Release 9)," Mar. 2010, 85 pages.

3GPP TS 23.402 V9.4.0 (Mar. 2010), Technical Specification, "3rd Generation Partnership Project; Technical Specification Group Services and System Aspects; Architecture enhancements for non-3GPP accesses (Release 9)," Mar. 2010, 198 pages.

* cited by examiner

UPDATING OF NETWORK SELECTION INFORMATION

The invention relates to Automatic Network Discovery and Selection Function (ANDSF) mechanisms (and the like) and to the use of ANDSF data or other network selection data.

Many mobile communication devices are able to make use of more than one communication access technology. For example, some mobile communication devices are able to make use of both the 3GPP standard and WLAN (wireless local area network).

Providing a mobile communication device with alternative communication technologies has a number of potential advantages. For example, the mobile communication device may be able to function in areas where only one of a number of access technologies is available. Also, if a user requires a low cost connection, then the cheapest of a number of available convection options can be chosen. Alternatively, if a user wants to send a large amount of data over a connection, then a connection with a high available bandwidth can be chosen.

It is known to provide mobile communication devices with information regarding access technologies that are available. Access Network Discovery and Selection Function (ANDSF) mechanisms allow a mobile operator to provide subscriber devices with inter-system mobility policies for automatic, intelligent network selection in a heterogeneous network environment, where a plurality of different non-3GPP access technologies are available together with 3GPP or fulfilling gaps where 3GPP is not available.

FIG. 1 is a block diagram of a system, indicated generally by the reference numeral 1, comprising a mobile communication device 2, an ANDSF server 4, a first mobile network 6 and a second mobile network 8.

In the use of the system 1, the ANDSF server 4 provides information to the mobile communication device 2 regarding the priority in which the access networks available to the mobile device (such as the networks 6 and 8) should be accessed. The mobile communication device requests this priority information from the ANDSF server 4, and the ANDSF server returns the requested data to the mobile communication device. The mobile communication device 2 may choose the network to be used with ANDSF communication according to existing network selection information or by any other means available to the mobile device.

FIG. 2 is a flow chart showing an algorithm, indicated generally by the reference numeral 10, showing an exemplary use of the system 1 by the mobile communication device 2.

The algorithm 10 starts at step 12, where ANDSF information is obtained. The ANDSF information may, for example, be provided (by the ANDSF server 4) on request from the mobile communication device 2 (in a "pull" mode) or may be provided in a manner determined and initiated by the ANDSF server (in a "push" mode).

The ANDSF server 4 provides a number of policies for connecting the mobile communication device 2 to networks (such as the first mobile network 6 or the second mobile network 8). Priorities are assigned to the various policies and, at step 14 of the algorithm 10, the highest priority valid policy is applied by the mobile communication device 2. A policy is considered to be "valid" if it meets a number of validity conditions. Such conditions may, for example, relate to location or the time of day.

The policy selected at step 14 will have a number of access network options associated with it. The access network options will be prioritized within the policy. At step 16 of the algorithm 10, the highest priority access network option of the selected policy is selected at the mobile communication device 2.

The algorithm 10 moves to step 18 where it is determined whether or not the highest priority access network option of the selected policy has resulted in a successful connection to an available network. If a network connection has been made, then the algorithm 10 terminates at step 24. If a connection has not been made then the algorithm 10 moves to step 20, where it is determined whether or not the selected policy has any more (lower priority) access network options available.

If no further access network options exist, the algorithm 10 terminates at step 24. If further access network options do exist, then the next highest priority access network is selected at step 22. The algorithm 10 then returns to step 18, where it is determined whether or not the newly selected access network results in a successful connection to an available network. If a connection is made, then the algorithm 10 terminates at step 24. If a connection is not made, then the algorithm 10 moves to step 20, as discussed above.

The algorithm 10 continues until either a successful connection is made or all access network options of the selected policy have been tried. In some implementations of ANDSF systems, if the highest priority valid policy does not result in a connection being made, then no further efforts are made to make a connection. In other implementations, if the highest priority valid policy does not result in a connection being made, then the next highest priority policy (if any) is used and steps 16 to 24 of the algorithm 10 are repeated using that policy.

In addition to providing network selection policies, ANDSF allows mobile operators to provide access network discovery information (ANDI) to assist user equipment (UE) in detecting access networks specified in the ANDSF policy rules. Policies are used to list preferred access networks in any given location or time.

Discovery information consists of radio technology specific information like frequencies and channels. This is particularly important, for example, for WiMAX where blind scanning of the whole frequency domain can take a considerable period of time (perhaps as much as 15 minutes or more) and can use considerable battery resources.

FIG. 3 is a block diagram showing an exemplary ANDSF management object (MO) structure, indicated generally by the reference numeral 30. The structure of the management object 30 is the same as that set out in the technical specification 3GPP TS 24.312 V 8.1.0 produced by the 3rd Generation Partnership Project (available at www.3gpp.org). The structure of the management object has been further developed and more recent versions of the management object are defined in the technical specifications 3GPP TS 24.312 V 8.5.0 and 3GPP TS 24.312 V 9.1.0. The principles of the present invention are applicable to all of these versions of the management object and, of course, to future developments.

The management object 30 is supplied to a user device (such as the user device 2) by an ANDSF server (such as the ANDSF server 4). As policies and rules are changed, the ANDSF server may update the data stored within the management object 30 at the user device.

The management object 30 is a tree of leaves and nodes. The tree starts at an interior node 32 (the root of the tree), which provides a placeholder, under which an account for a fixed node may be provided. As shown in FIG. 3, a number of nodes and leaves are provided under the node 32, some (but not all) of which are discussed below.

A Name leaf 34, a Policy node 36, a DiscoveryInformation node 40, a UE_Location node 44 and an Ext node 46 are provided under the node 32, i.e. at the next level of the tree 30.

The name leaf 34 enables a name to be stored. The name stored at the name leaf 34 is not the formal name of the ANDSF MO. The name of the ANDSF MO is given at node 32. The name stored at the leaf 34 is a string and is generally the name that is shown to the user in any user interface associated with the tree 30.

The policy node 36 acts as a placeholder for policies for intersystem mobility. An interior node 38 is located under the policy node 36. Policies are stored under the node 36, with one policy being stored within each instance of the node 38. The ANDSF MO 30 shown in FIG. 3 follows the OMA DM syntax for Management Objects, such that the symbol '+' after a node or leaf name (as with the node 38) indicates that one or more instances of the node or leaf is present in any particular ANDSF MO.

As shown in the algorithm 10 discussed above, the highest priority valid policy may be selected when a user is attempting to connect to a network. The data stored at and under the policy node 36 can, amongst other functions, be used to determine the validity and priority of policies.

The DiscoveryInformation node 40 acts as a root node for access network discovery information. As discussed above, access network discovery information (ANDI) can be used by a user device in detecting access networks specified in ANDSF policy rules. The access network discovery information is stored with the ANDSF MO tree 30 at and below the DiscoveryInformation node 40.

The UE_Location node 44 acts as a placeholder for data describing the current location of a user device. A range of location information is stored at nodes and leaves under the node 44, as shown in FIG. 3, but not discussed further here.

The rule structure shown in FIG. 3 includes a rule priority leaf 39 that represents the priority given to one particular rule and is represented as a numerical value. Other nodes and leaves are shown in FIG. 3, but are not discussed further here.

Referring to FIG. 1, when the user device 2 contacts the ANDSF server 4, the ANDSF server 4 should determine whether or not any of the policies stored previously by the operator (e.g. by the same ANDSF server or by any other ANDSF server providing an ANDSF service for the operator) under the policy node 36 of the management object 30 need to be updated. For operational efficiency, it is important that this procedure is performed efficiently and avoids excess signaling. OMA DM based settings provisioning with many current mobile communication devices can consume tens of seconds even with simple settings. OMA DM tree discovery for the root node can take as long as 5 minutes and transferred data traffic may be close to 1 MB for both directions.

A particular problem associated with updating ANDSF policies as stored at the user device is that the ANDSF server 4 is typically in control of the process, but the user device 2 stores the policies that may or may not need to be updated. Thus, the steps required to enable the server to determine which of the data sets stored at the user device need to be updated is not trivial.

One mechanism for determining whether or not any of the ANDSF policies stored at a user device 2 need to be updated involves simply reading all of the policies stored at the user device and comparing those policies with those that would be provided to the user device by the ANDSF server 4. Clearly, this brute force comparison of policy attributes is a very costly and time consuming operation. Moreover, the currently used OMA DM protocol (SYNCML) does not have a procedure to read complete subtrees to any depth—it can only read names of immediate subnodes of any given interior node at any one time. The management object 30 is very complex and contains a large amount of data. The information retrieval from the user device 2 alone could easily take tens of seconds, even up to a minute. This is very wasteful in terms of time, network resources and power.

Alternatively the server might recall what policies have been provided to the user device and ensure that those policies still exist in the device. This is not trivial either as this requires potentially complex ANDSF state storage and additional logic to figure out if a policy has been modified for the subscriber.

The present invention seeks to address at least some of the problems outlined above.

The present invention provides a method (for example, of editing mobile telecommunication network selection data, such as Automatic Network Discovery and Selection Function (ANDSF) data), the method comprising: obtaining a first set of policy signatures from a mobile communication device, wherein each signature is generated from a policy (each signature may be generated from the content of the policy rule concerned) of (and typically stored at) the mobile communication device; comparing the first set of policy signatures with a second set of policy signatures of (and typically stored at) a server (such as a network selection data server, e.g. an ANDSF server), wherein each signature of the second set of policy signatures is generated (each signature may be generated from the content of the policy rule concerned) from a policy of (and typically stored at) the (network selection) server that has been deemed (by the server) to be a correct (or current) policy for the mobile communication device; identifying a third set of policy signatures comprising any policy signature included in the first set of policy signatures that is not included in the second set of policy signatures; identifying a fourth set of policy signatures comprising any signature included in the second set of policy signatures that is not included in the first set of policy signatures; instructing the mobile communication device to delete policies corresponding to the third set of policy signatures; and instructing the mobile communication device to add policies corresponding to the fourth set of policy signatures.

As noted above, each signature may be generated from the relevant policy rule. In the exemplary management object described in detail above with respect to FIG. 3, the signatures may be calculated on the basis of the content of the node 38 and all of the nodes underneath the node 38 in the management object tree.

The method may include selecting only those policies that belong to the operator whose ANDSF server is running now. The mobile communication device can have policies from any number of operators (roaming cases) and each ANDSF server should only consider those policies that belong to it (e.g. where there is a PLMNID match).

The present invention also provides an apparatus (typically a server, such as an ANDSF server) comprising: a first input for receiving a first set of policy signatures from a mobile communication device, wherein each signature is generated from a policy of (and typically stored at) the mobile communication device; a first processor for comparing the first set of policy signatures with a second set of policy signatures, wherein each signature of the second set of policy signatures is generated (each signature may be generated from the content of the policy rule concerned) from a policy of (and typically stored at) the server that has been deemed to be a correct (or current) policy for the mobile communication device, wherein the first processor (or another processor) is adapted to generated a third set of policy signatures comprising any policy signature included in the first set of policy signatures that is not included in the second set of policy signatures and a fourth set of policy signatures comprising any signature included in the second set of policy signatures that is not included in the first set of policy signatures; a first output for instructing the mobile communication device to delete policies corresponding to the third set of policy signatures; and a second output (which may be the same physical output at the first output) for instructing the mobile communication device to add policies corresponding to the fourth set of policy signatures. The apparatus may be adapted to generate the second set of policy signatures (e.g. using a processor). As noted above, each signature may be generated from the relevant policy rule. In the exemplary management object described in detail above with respect to FIG. 3, the signatures may be calculated on the basis of the content of the node 38 and all of the nodes underneath the node 38 in the management object tree.

Thus, the present invention enables just those branches of a policy set as stored at a user device that need to be updated to be updated and also provides a simple method to identify the branches of the policy set that need to be updated.

This simple but effective mechanism of the invention enables a simple server implementation (e.g. an ANDSF server implementation), without storing user device specific policy information at the ANDSF server. The invention also minimizes the communication required between the user device and the server, thereby boosting capacity of the server and limiting user device battery consumption.

The said policies may comprise network selection policies (such as ANDSF policies). Alternatively, or in addition, the said policies may comprise access network discovery information (such as ANDI). Access network discovery information (ANDI) can be considered to be a "policy" as that term is used in the present document.

In some forms of the invention, obtaining the first set of policy signatures from the mobile communication device includes obtaining the name of each policy, wherein the signature is stored as part of the name of the policy. In alternative forms of the invention, the signature may be stored as a member or leaf of the policy node, such that obtaining the signature comprises obtaining that policy member or leaf.

The first policy signatures may be retrieved from the device within an HTTP session initiated by the device either by device itself or on request by the operator (e.g. ANDSF server).

The invention may include the generation (for example, at the server) of the policies from which the second set of policy signatures are generated. The policies may, for example, be selected based at least in part on the location of the user device.

The invention may further include the generation (typically at the server) of the second set of policy signatures.

The method of the present invention may be is carried out by an automatic network discovery and selection function (ANDSF) server. The apparatus of the present invention may be an automatic network discovery and selection function (ANDSF) server In many forms of the invention, the said policy signatures are generated from said policies using a cryptographic hash function (such as an MD5 hash function or an SHA-1 hash function). Of course, the skilled person will be aware of many alternative signature generation algorithms that could be used. In essence, any function that can be expected (with a high degree of confidence) to produce a different signature for any two different set of data and same signature for the same data at all times could be used.

The present invention also provides a mobile communication device comprising: a first output for providing a first set of policy signatures of the mobile communication device (that are typically stored at the mobile communication device), wherein each signature is generated (each signature may be generated from the content of the policy rule concerned) from a policy (such as a network selection policy or a network discovery policy) of (and typically stored at) the mobile communication device; a first input for receiving instructions from a server to delete policies (such as network selection policies or network discovery policies) corresponding to a third set of policy signatures, wherein the third set of policy signatures are identified (by the server, such as an ANDSF server) as being included in the first set of policy signatures but not included in a set of policies that the server deems to be a correct (or current) set of policies for the mobile communication device; a second input (which may be the same physical input as the first input) for receiving instructions from the server to add policies (such as network selection or network discovery policies) corresponding to a fourth set of policy signatures, wherein the fourth set of policy signatures are identified (by the server, such as an ANDSF server) as not being included in the first set of policy signatures but being included in the set of policies that the server deems to be a correct/current policy set for the mobile communication device; and a first processor for implementing the instructions to add and/or delete said policies. The said policies may be network selection policies. Alternatively, or in addition, the said policies may be access network discovery information. The server may be an ANDSF server.

The present invention yet further provides a method (such as a method of editing mobile telecommunication network selection data as stored at a mobile communication device), the method comprising: providing (typically at an output of a mobile communication device) a first set of policy signatures of a mobile communication device, wherein each signature is generated (each signature may be generated from the content of the policy rule concerned) from a policy of the mobile communication device; receiving (e.g. at a first input of the mobile communication device) instructions from a server (e.g. an ANDSF server) to delete policies corresponding to a third set of policy signatures, wherein the third set of policy signatures are identified as being included in the first set of policy signatures but not included in a set of policies that the server deems to be a correct (or current) set of policies for the mobile communication device; receiving (e.g. at a second input of the mobile communication device) instructions from the server to add policies corresponding to a fourth set of policy signatures, wherein the fourth set of policy signatures are identified as not being included in the first set of policy signatures but being included in the set of policies that the server deems to be correct/current for the mobile communication device; and implementing (e.g. under the control of a processor of the mobile communication device) the instructions to add and/or delete said policies. The said policies may be network selection policies. Alternatively, or in addition, the said policies may be access network discovery information.

The invention also provides computer program product comprising: code (or some other means) for obtaining a first set of policy signatures from a mobile communication device, wherein each signature is generated (each signature may be generated from the content of the policy rule concerned) from a policy of (and typically stored at) the mobile communication device; code (or some other means) for comparing the first set of policy signatures with a second set of policy signatures of (and typically stored at) a server (such as a network selection data server, e.g. an ANDSF server), wherein each signature of the second set of policy signatures is generated from a policy of (and typically stored at) the (network selection) server that has been deemed to be a correct (or current) policy for the mobile communication device; code (or some other means) for identifying a third set of policy signatures comprising any policy signature included in the first set of policy signatures that is not included in the second set of policy signatures; code (or some other means) for identifying a fourth set of policy signatures comprising any signature included in the second set of policy signatures that is not included in the first set of policy signatures; code (or some other means) for instructing the mobile communication device to delete policies corresponding to the third set of policy signatures; and code (or some other means) for instructing the mobile communication device to add policies corresponding to the fourth set of policy signatures. The computer program may be a computer program product comprising a computer-readable medium bearing computer program code embodied therein for use with a computer.

The present invention yet further provides a computer program comprising: code (or some other means) for providing (typically at an output of a mobile communication device) a first set of policy signatures of a mobile communication device, wherein each signature is generated (each signature may be generated from the content of the policy rule concerned) from a policy of the mobile communication device; code (or some other means) for receiving (e.g. at a first input of the mobile communication device) instructions from a server (e.g. an ANDSF server) to delete policies corresponding to a third set of policy signatures, wherein the third set of policy signatures are identified as being included in the first set of policy signatures but not included in a set of policies that the server deems (e.g. calculates) to be a correct/current set of policies for the mobile communication device; code (or some other means) for receiving (e.g. at a second input of the mobile communication device) instructions from the server to add policies corresponding to a fourth set of policy signatures, wherein the fourth set of policy signatures are identified as not being included in the first set of policy signatures but being included in the set of policies that the server deems to be correct/current for the mobile communication device; and code (or some other means) for implementing (e.g. under the control of a processor of the mobile communication device) the instructions to add and/or delete said policies. The computer program may be a computer program product comprising a computer-readable medium bearing computer program code embodied therein for use with a computer.

Exemplary embodiments of the invention are described below, by way of example only, with reference to the following numbered schematic drawings.

The present invention includes the generation of a signature or a message digest (for example, signatures or message digests produced by cryptographic hash algorithms such as MD5 and SHA-1) for each policy rule stored under the policy node 36 of the management object (MO) 30. The signature may be included in the MO itself. By way of example, the signature may be included as part of the policy name stored at the node 38 or as a new leaf entry under the node 38. The term "signature" is used throughout this document and should be read to encompass terms such as "message digest".

Figure 1:
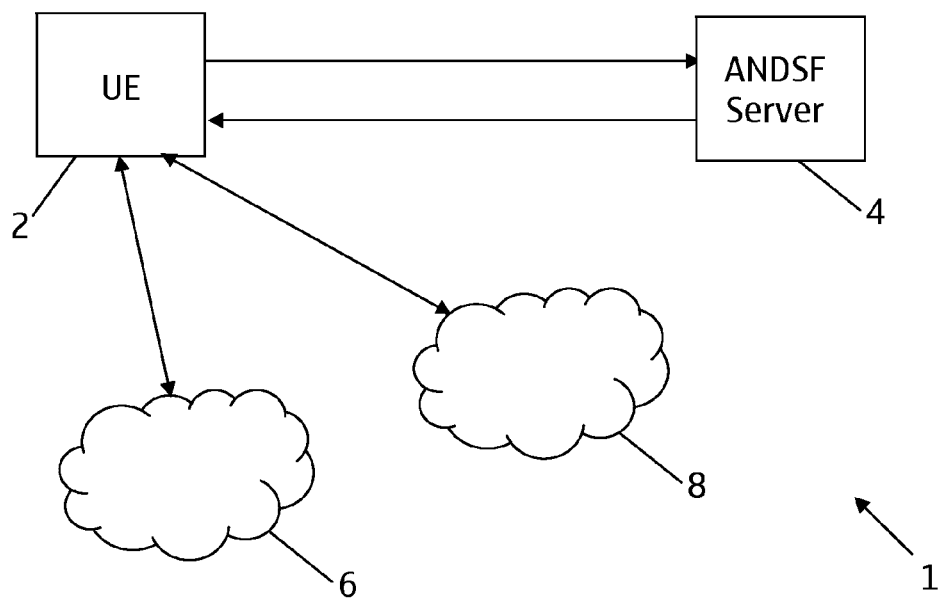
FIG. 1 is a block diagram of a system in which the present invention may be used.
Figure 4:
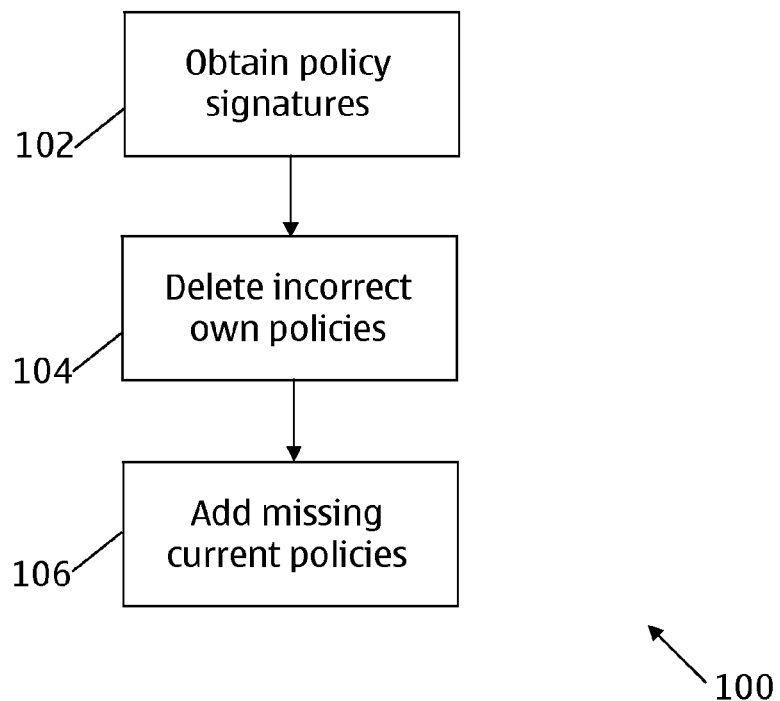
FIG. 4 is a block diagram showing an algorithm in accordance with an aspect of the present invention.
Figure 2:
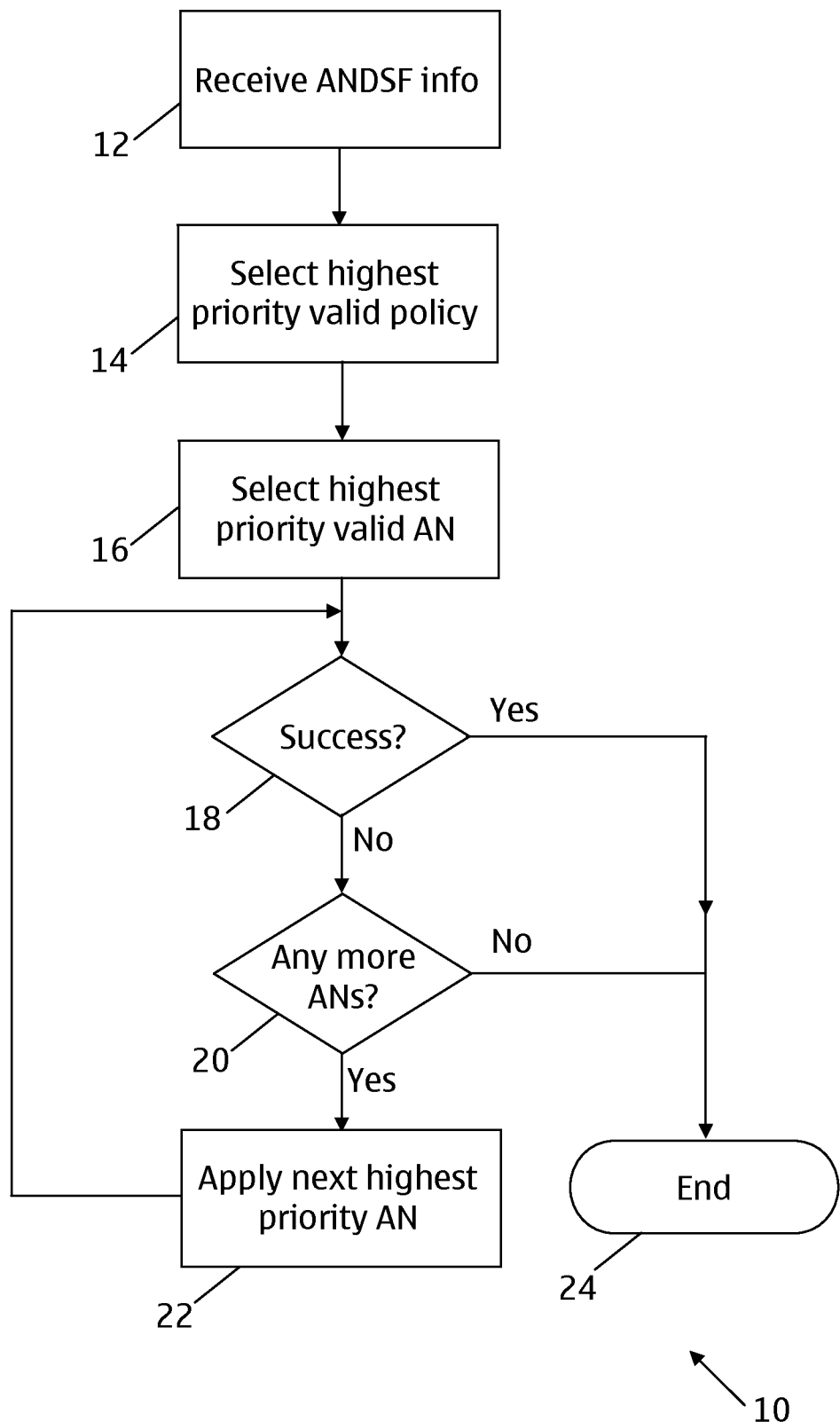
FIG. 2 is a flow chart showing a network access selection algorithm.
Figure 3:
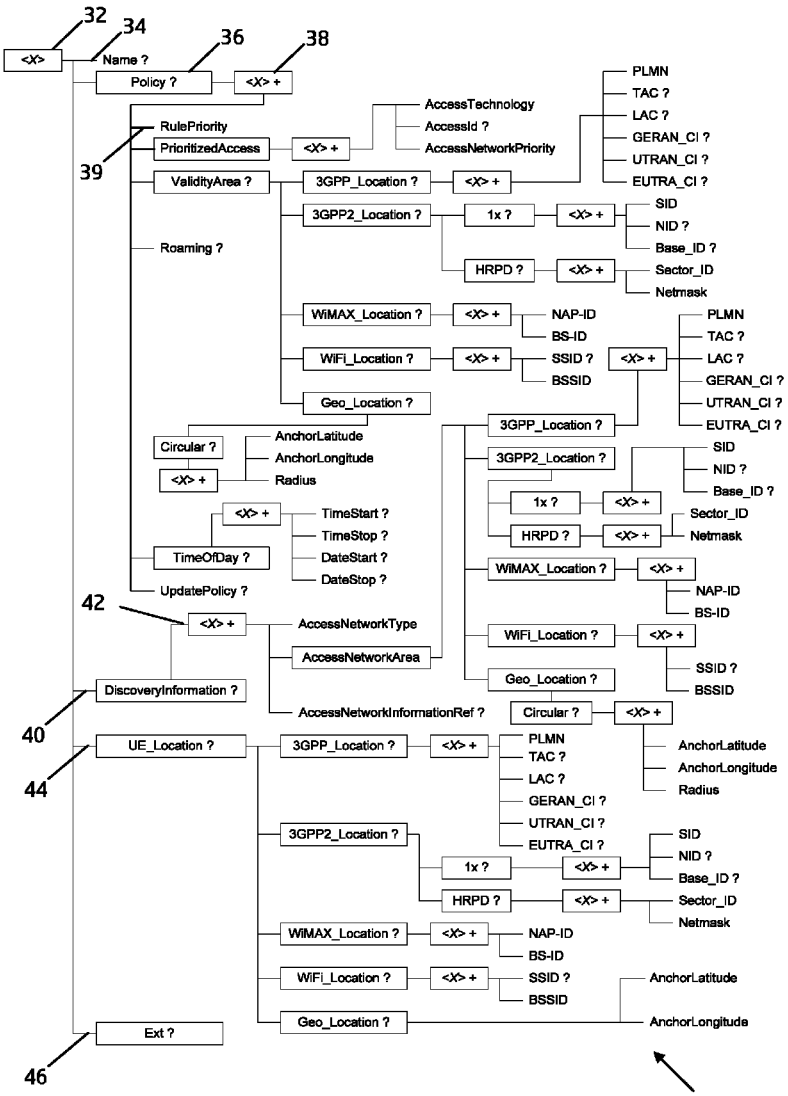
FIG. 3 is a block diagram showing an exemplary ANDSF management object structure.

FIG. 4 is block diagram showing an algorithm, indicated generally by the reference numeral 100, in accordance with an aspect of the present invention. The algorithm 100 demonstrates a method for updating policy information, as stored at a user device, such as the user device 2. In the example described below, the updated policies are provided by the ANDSF server 4.

The algorithm 100 starts at step 102, where policy signatures, as stored at the user device 2 as part of the management object 30, are obtained by the ANDSF server 4. Each ANDSF server is relevant for an operator and the server shall consider only those policies that were installed by the same operator ANDSF server. The operator is typically identified by a PLMN code and this PLMN code is also stored into each policy node as leaf entry. There are no constraints for the policy name other than uniqueness and the ANDSF server could, for example, invent a naming scheme for the policy, which includes both PLMNID and policy signature.

If the signatures are stored as part of the policy name node 38, then the step 102 may simply involve obtaining the name of each instance of the node 38 for the management object 30.

The ANDSF server 4 compares the signatures obtained from the user device 2 with the signatures of policies that the ANDSF server 4 determines are the correct (or current) policies for the user device 2 at the current time and at the current location of the user device. In order to do so, the ANDSF server 4 could generate signatures for the policies that should be present in the user device 2. By way of example, the set of policy signatures retrieved from the user device may be stored as a set called OLD_POLICIES and those policies that should be present in the user device are called NEW_POLICIES. It should be noted that the OLD_POLICIES should contain only policies provided by the current PLMN that the ANDSF server is serving. Other policies from other operators are not included in the set. The ANDSF server 4 may retrieve all policies, but the server must make use of only those policies that belong to the current operator.

At step 104, the ANDSF server 4 determines whether any of the signatures retrieved from the user device (the OLD_POLICIES) fail to match any of the signatures of the correct policies for the user device (the NEW_POLICIES). If so, the policies associated with the signatures stored at the user device that are not part of the correct policies list are deleted from the user device 2. Such policies are deleted since they are either not valid any more for the user device (perhaps due to a change in the location of the user device) or their content has been modified by the ANDSF server 4 since the relevant ANDSF data was last uploaded to the user device. Of course, any change in the policy content is revealed by a change in the signature—the reason for the change is not relevant to the present invention; it is the identification that a change has occurred is important to the invention.

At step 106, the ANDSF server determines whether there are any signatures of correct policies for the user device (the NEW_POLICIES) that are not included in the signatures retrieved from the user device (the OLD_POLICIES). If so, the policies associated with those signatures are uploaded to the user device 2. The step 106 can be executed together with the obsolete policy deletion (step 104), i.e. at the same time. Policy deletion is a simple operation as the deletion of interior node will automatically make the user device delete all sub-nodes and leaves.

Any signatures retrieved from the user device that match signatures of policies to be provided to the user device are maintained at the user device, since they indicate that the policy concerned is already available in the user device and is identical to the policy that would otherwise be uploaded by the ANDSF server.

Thus, the present invention enables just those branches of the MO tree 30 that need to be updated to be updated and also provides a simple method to identify the branches of the MO tree 30 that need to be updated. ANDSF servers can easily be added as they don't need to store any state information for the user. It is required only that the server is able to calculate the correct policies for the user at any point and time and order the content of (serialize) each policy so that it can calculate the same signature every time when the policy is not modified. And even if the serialization fails for some reason, the system is still operational—the ANDSF server just keeps deleting and creating new policies each time user device contacts the server.

The invention therefore provides a simple and elegant solution to at least some of the problems discussed above.

Figure 5:
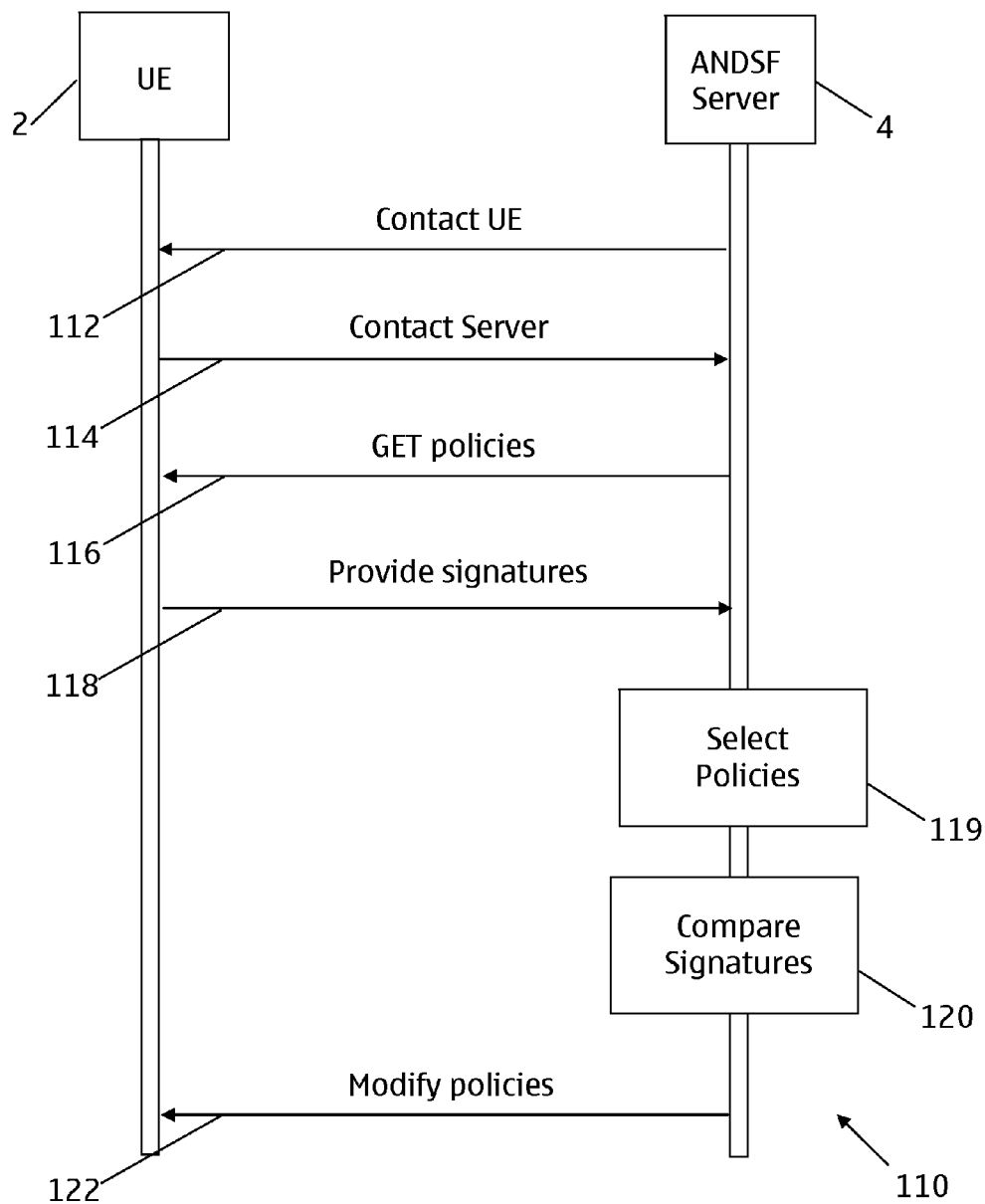
FIG. 5 is a simplified message sequence in accordance with an aspect of the present invention.

FIG. 5 shows a message sequence, indicated generally by the reference numeral 110, between the user device 2 and the ANDSF server 4 in accordance with an aspect of the present invention.

The message sequence 110 starts with the ANDSF server 4 contacting the user device 2 (the message 112) and the user device 2 contacting the ANDSF server 4 in response (the message 114).

The message 112 might be sent using SMS and asking the user device to initiate an OMA DM connection.

The message 114 might, for example, contain an OMA DM ALERT command included in an HTTP POST message. ALERT commands include an indication regarding whether the session was initiated due to request of the server or it was a user device initiated session.

The message 114 typically includes an ANDSF service request. An initial secure TLS connection setup for HTTP session carrying the OMA DM commands is omitted from the message sequence 110. It should be noted that in many exemplary embodiments of the invention, the algorithm 110 is initiated by the user device 2 in the message 114. In such embodiments, the message 112 may be omitted.

In response to the message 114, the ANDSF server 4 issues a GET command 116 to retrieve the information concerning the existing policies stored at the user device 2 and possibly also regarding the location of the user device 2. The command 116 may be sent inside an HTTP Response message. This can be somewhat confusing as an HTTP Response carries the commands issued by the server and an HTTP POST conveys the responses from the device. The device can only issue ALERT and ABORT commands, otherwise it just provides operation results inside the HTTP POST messages.

The command 116 may take the following form:
GET ("./ANDSF/Policies", "./ANDSF/UE_Location")

Such that the GET request asks for a list of ANDSF policies stored at the user device 2, together with location data of the device.

In response to the GET command 116, the user device provides the requested information, for example in an HTTP POST message 118. The message 118 includes the signatures for the policies stored at the user device 2, as described above. The message 118 may provide the following information in response to the GET request:

RESULT ("./ANDSF/Policies=<PLMN><HASH1>/<PLMN><HASH2>/..", "./ANDSF/UE_Location=..")

In the result shown above, each policy name and associated hash data (or signature) is provided in the result. Thus, in this example, the message 118 provides the names of the policies stored under the node 36 of the MO 30 and, as described above, each name is adapted to include the signature for the policy concerned. Optionally, if the PLMN identity and the signature are only stored as leaf entries under each policy, then the server needs to issue new GET commands for each PLMN and signature under the retrieved policy nodes.

On receipt of the signature information, the ANDSF server 4 selects (at step 119) a set of policies that is current for the user device 2. This selection may, for example, be at least partially based on the location of the user device. The ANDSF server 4 also arranges the policy data according to some predefined mechanism to make it possible to calculate the same signature for the same data. Otherwise if the policy data is sent in different internal order (there is no mandatory order for leaves and nodes in the ANDSF specifications) then the signature may be different despite the content of the policies being the same. The ANDSF server generates a signature for each of those policies (assuming that the signatures are already available). The signatures may be generated using a cryptographic hash function, such as an MD5 or SHA-1 hash function.

Next, at step 120 of the algorithm 110, the ANDSF server 4 compares the signatures of the policies generated at the step 119 with the signatures obtained in the message 118. Thus, at step 120, the ADNSF server 4 determines which (if any) of the policies stored at the user device 2 should be deleted (i.e. those policies stored at the user device that are not included in the policies to be provided from the ANDSF server to the user device but still belong to the current operator) and which (if any) of the policies selected at step 119 should be uploaded to the user device 2 (i.e. those policies included in the policies to be provided from the ANDSF server to the user device that are not already stored at the user device).

The ANDSF server 4 then sends the required OMA DM commands (as message 122) as a response to the HTTP POST command 118. The user device 2 then executes the commands in order to delete and/or add policies to the MO 30 stored at the user device 2 and the HTTP Session is terminated. Confirmation messages (not shown in FIG. 5) may be transmitted between the user device 2 and the ANDSF server 4.

Thus, the present invention can be used to implement a stateless provisioning without storing any information about the previous provisioning. According to the ANDSF specification, the ANDSF server decides the name for the policy MO freely (provided that the name is unique). According to an exemplary embodiment of the invention, when the ANDSF server defines a policy, the policy name shall include a signature of the policy content. This signature could be for example MD5 hash calculated over the entries included in the policy MO. When the user device 2 requests an ANDSF service from the server, the server needs to fetch the name of all policy entries in the user device. As mentioned above, this can be achieved using a simple GET message for the "./ANDSF/Policies" management object. The server needs to identify its own policy entries as there can be also policy entries from other operators if the user device has been roaming earlier. If the name also includes <PLMNID>, then this is enough for determining the ANDSF server's own policy entries, alternatively the server may fetch also the PLMN ID entry under each policy MO. The server can fetch the user device location together with the "./ANDSF/Policies" entry and based on this it can build or choose correct/current policies for the user device. The signature shall be calculated for each of these entries too. Now it is very simple task to compare the signatures from retrieved policy names with the signatures of the new policies. Those which match shall be left intact at the user device, those which do not match (but which are still owned by the current operator running the ANDSF server) shall be deleted from the user device and those which are not present in the user device shall be added to the user device.

This simple but yet so effective mechanism enables a simple ANDSF server implementation, without storing user device specific policy information at the ANDSF server. The invention also minimizes the communication required between the user device 2 and the ANDSF server 4, thereby boosting capacity of the server and limiting user device battery consumption.

The embodiments of the invention described above have used the well known MD5 algorithm for generating policy signatures. This is not an essential feature of the invention. Any suitable algorithm could be used for generating a signature or a checksum. The key requirement is that when an algorithm used to generate policy signatures generates two identical signatures, this implies (to a reasonable degree of confidence) that the policies concerned are identical.

The present invention has been described with reference to the updating of ANDSF information. However, the invention is not so limited. The invention could work with other forms of network selection data. The invention could also be applied to the updating of discovery information, such as the access network discovery information (ANDI) that is stored under the node 40. By way of example, the nodes 42 could store signature information relating to each instance of the ANDI data. This signature could be obtained by the ANDSF server and used to determine whether data needs to be added or deleted to/from the management object 30 in accordance with the principles of the invention described above.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

The invention claimed is:

1. A method comprising:
    obtaining by a server, a first set of policy signatures from a mobile communication device, wherein each signature is generated identically and individually from a policy of the mobile communication device, without knowledge of a previous provisioning of policies, and wherein a same signature is generated from same input data via cryptographic hash functions so that one similar policy results in the same identical and individual signature;
    comparing the first set of policy signatures with a second set of policy signatures of a server, wherein each signature of the second set of policy signatures is generated from a policy of the server that has been deemed to be a correct policy for the mobile communication device;
    identifying a third set of policy signatures comprising any policy signature included in the first set of policy signatures that is not included in the second set of policy signatures;
    identifying a fourth set of policy signatures comprising any signature included in the second set of policy signatures that is not included in the first set of policy signatures;
    instructing the mobile communication device to delete policies corresponding to the third set of policy signatures; and
    instructing the mobile communication device to add policies corresponding to the fourth set of policy signatures.

2. A method as claimed in claim 1, wherein said policies comprise network selection policies.

3. A method as claimed in claim 1, wherein said policies comprise access network discovery information.

4. A method as claimed in claim 1, wherein obtaining the first set of policy signatures from the mobile communication device includes obtaining the name of each policy, wherein the signature is stored as part of the name of the policy.

5. A method as claimed in claim 1, wherein the first policy signatures are retrieved from the mobile communication device within an HTTP session initiated by the mobile communication device.

6. A method as claimed in claim 1, further comprising the step of generating the policies from which the second set of policy signatures are generated.

7. A method as claimed in claim 1, further comprising the step of generating the second set of policy signatures.

8. A method as claimed in claim 1, wherein the method is carried out by an automatic network discovery and selection function server.

9. A method as claimed in claim 1, wherein each signature of the first set of policy signatures is generated by a policy server from contents of the policy of the mobile communication device.

10. An apparatus comprising:
    a first input for receiving at a server, a first set of policy signatures from a mobile communication device, wherein each signature is generated from a policy of the mobile communication device;
    a first processor for comparing the first set of policy signatures with a second set of policy signatures, wherein each signature of the second set of policy signatures is generated identically and individually from a policy that has been deemed to be a correct policy for the mobile communication device, without knowledge of a previous provisioning of policies, and wherein a same signature is generated from same input data via cryptographic hash functions so that one similar policy results in the same identical and individual signature,
    wherein the first processor is adapted to generate a third set of policy signatures comprising any policy signature included in the first set of policy signatures that is not included in the second set of policy signatures, and adapted to generate a fourth set of policy signatures comprising any signature included in the second set of policy signatures that is not included in the first set of policy signatures;
    a first output for instructing the mobile communication device to delete policies corresponding to the third set of policy signatures; and
    a second output for instructing the mobile communication device to add policies corresponding to the fourth set of policy signatures.

11. An apparatus as claimed in claim 10, wherein said policies comprise network selection policies.

12. An apparatus as claimed in claim 10, wherein said policies comprise access network discovery information.

13. An apparatus as claimed in claim 10, further comprising generating the policies from which the second set of policy signatures are generated.

14. An apparatus as claimed in claim 10, further comprising generating the second set of policy signatures.

15. An apparatus as claimed in claim 10, wherein the apparatus is an automatic network discovery and selection function server.

16. A mobile communication device comprising:
- a first output for providing a server, a first set of policy signatures of the mobile communication device, wherein each signature is generated identically and individually from a policy of the mobile communication device, without knowledge of a previous provisioning of policies, and wherein a same signature is generated from same input data via cryptographic hash functions so that one similar policy results in the same identical and individual signature;
- a first input for receiving instructions from a server to delete policies corresponding to a third set of policy signatures, wherein the third set of policy signatures are identified as being included in the first set of policy signatures but not included in signatures of a set of policies that the server deems to be a correct set of policies for the mobile communication device;
- a second input for receiving instructions from the server to add policies corresponding to a fourth set of policy signatures, wherein the fourth set of policy signatures are identified as not being included in the first set of policy signatures but being included in the signatures of the set of policies that the server deems to be a correct set of policies for the mobile communication device; and
- a first processor for implementing the instructions to add and/or delete said policies.

17. A computer program product comprising non-transitory computer readable medium bearing computer program code for performing the steps of:
- obtaining by a server, a first set of policy signatures from a mobile communication device, wherein each signature is generated identically and individually from a policy of the mobile communication device, without knowledge of a previous provisioning of policies, and wherein a same signature is generated from same input data via cryptographic hash functions so that one similar policy results in the same identical and individual signature;
- comparing the first set of policy signatures with a second set of policy signatures of a server, wherein each signature of the second set of policy signatures is generated from a policy of the server that has been deemed to be a correct policy for the mobile communication device;
- identifying a third set of policy signatures comprising any policy signature included in the first set of policy signatures that is not included in the second set of policy signatures;
- identifying a fourth set of policy signatures comprising any signature included in the second set of policy signatures that is not included in the first set of policy signatures;
- instructing the mobile communication device to delete policies corresponding to the third set of policy signatures; and
- instructing the mobile communication device to add policies corresponding to the fourth set of policy signatures.

* * * * *